United States Patent [19]
Sakai et al.

[11] Patent Number: 5,235,618
[45] Date of Patent: Aug. 10, 1993

[54] VIDEO SIGNAL CODING APPARATUS, CODING METHOD USED IN THE VIDEO SIGNAL CODING APPARATUS AND VIDEO SIGNAL CODING TRANSMISSION SYSTEM HAVING THE VIDEO SIGNAL CODING APPARATUS

[75] Inventors: Kiyoshi Sakai, Yokohama; Takashi Itoh, Yamato; Kiichi Matsuda, Kawasaki, all of Japan

[73] Assignee: Fujitsu Limited, Kawasaki, Japan

[21] Appl. No.: 609,747

[22] Filed: Nov. 6, 1990

[30] Foreign Application Priority Data

Nov. 6, 1989 [JP] Japan .................................. 1-287344

[51] Int. Cl.⁵ .......................................... H04B 14/04
[52] U.S. Cl. ...................................... 375/25; 358/431
[58] Field of Search ............... 375/7, 25, 118; 370/60, 370/85, 94, 85.3, 94.1, 79, 85.7; 340/825.5, 825.4; 358/261.1, 431

[56] References Cited

U.S. PATENT DOCUMENTS

| | | | |
|---|---|---|---|
| 4,704,628 | 11/1987 | Chen et al. | 375/27 |
| 4,763,320 | 8/1988 | Rudolph et al. | 370/100.1 |
| 4,887,262 | 12/1989 | Van Velduizen | 370/85.1 |
| 4,995,056 | 2/1991 | Fogg, Jr. et al. | 375/7 |

Primary Examiner—Stephen Chin
Attorney, Agent, or Firm—Staas & Halsey

[57] ABSTRACT

A signal coding apparatus, which is coupled, via a transmission path, to a receiver having a receiver buffer and a decoder, includes a coding unit for coding a signal and outputting information generated in a frame unit, the information being a coded signal. The apparatus also includes a transmitter buffer for temporarily storing the information, and a controller for controlling an amount of the information on the basis of a storage capacity of the receiver buffer and an amount of the information which is contained in a frame per a unit time. There is also provided a method used in the above coding apparatus, and a signal coding transmission system employing the signal coding apparatus.

27 Claims, 9 Drawing Sheets

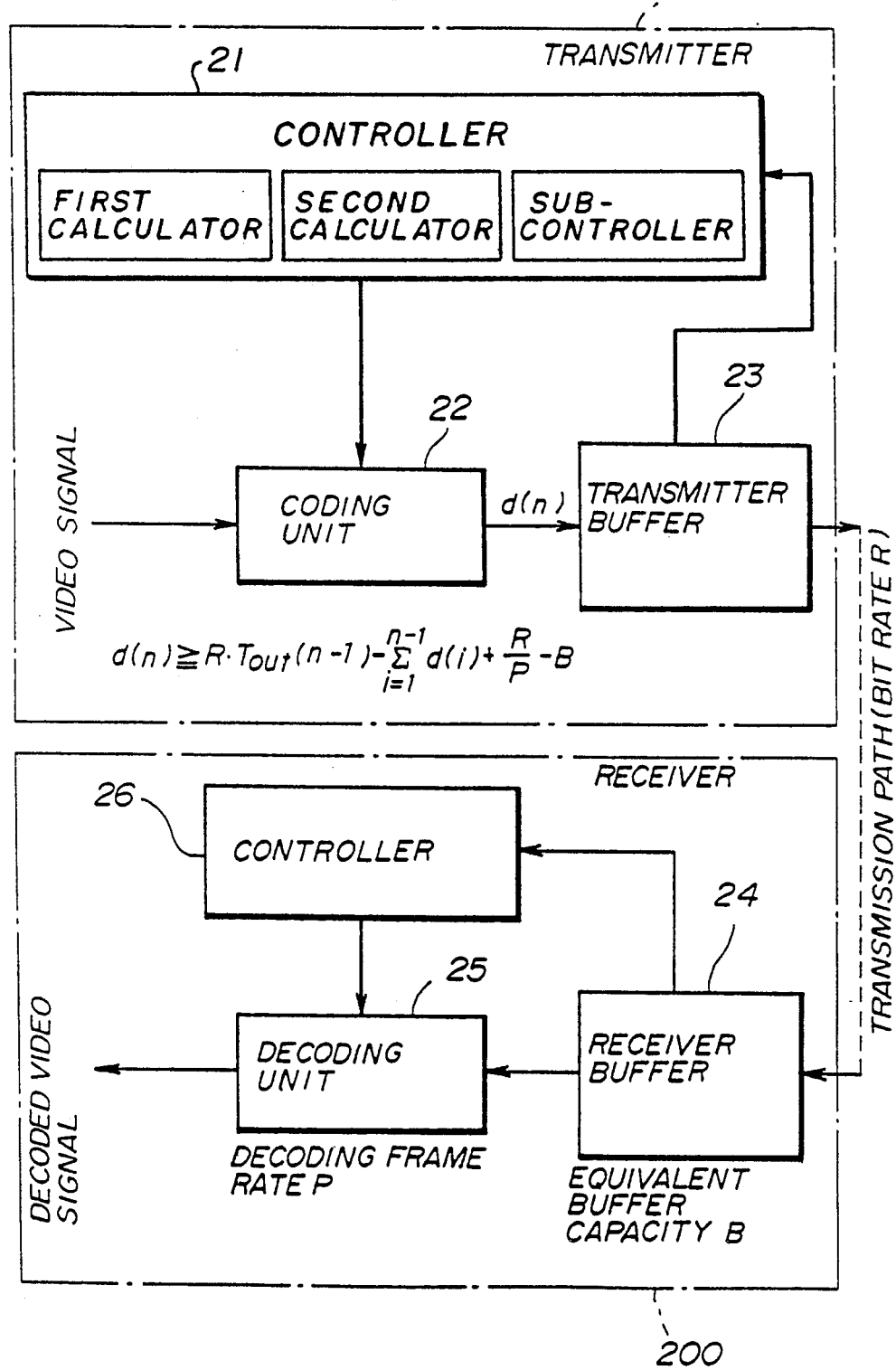

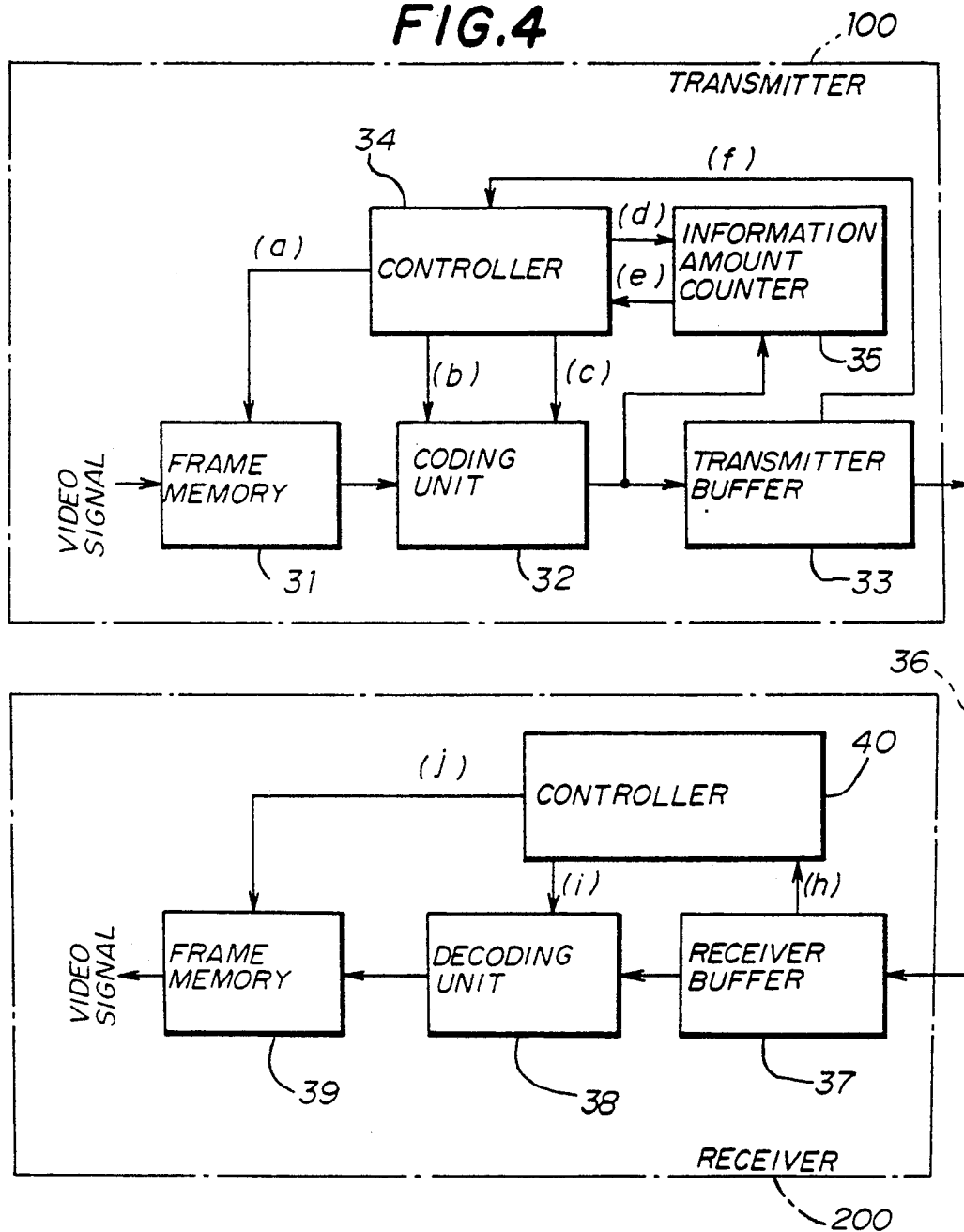

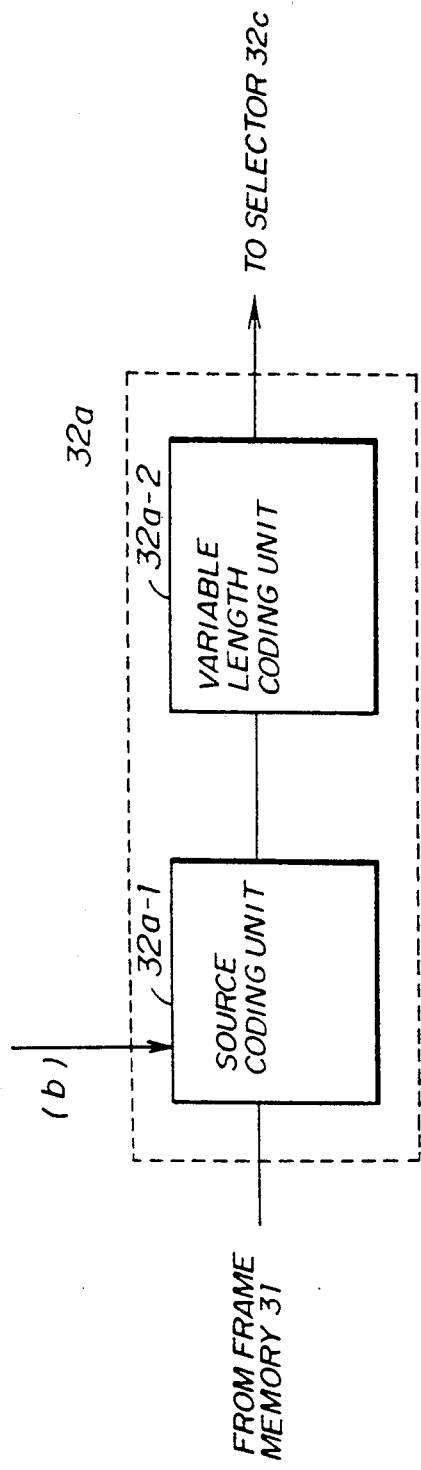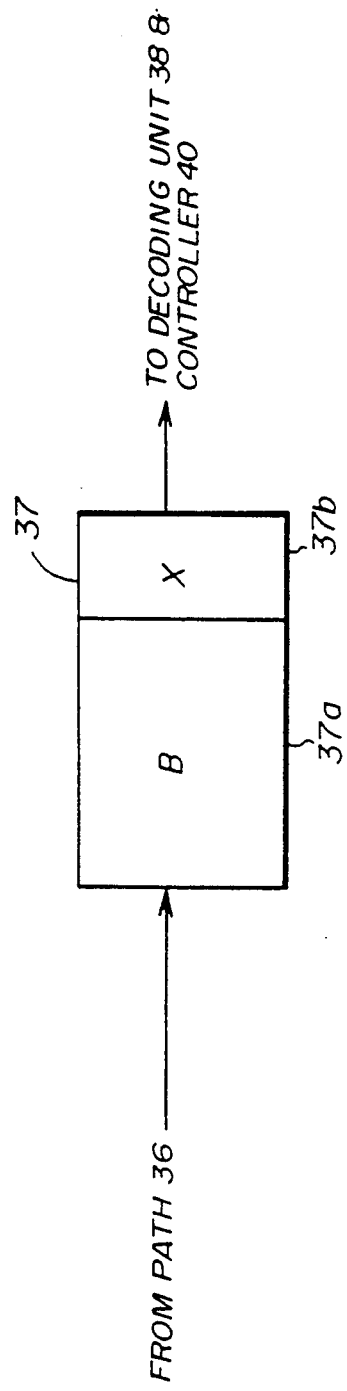

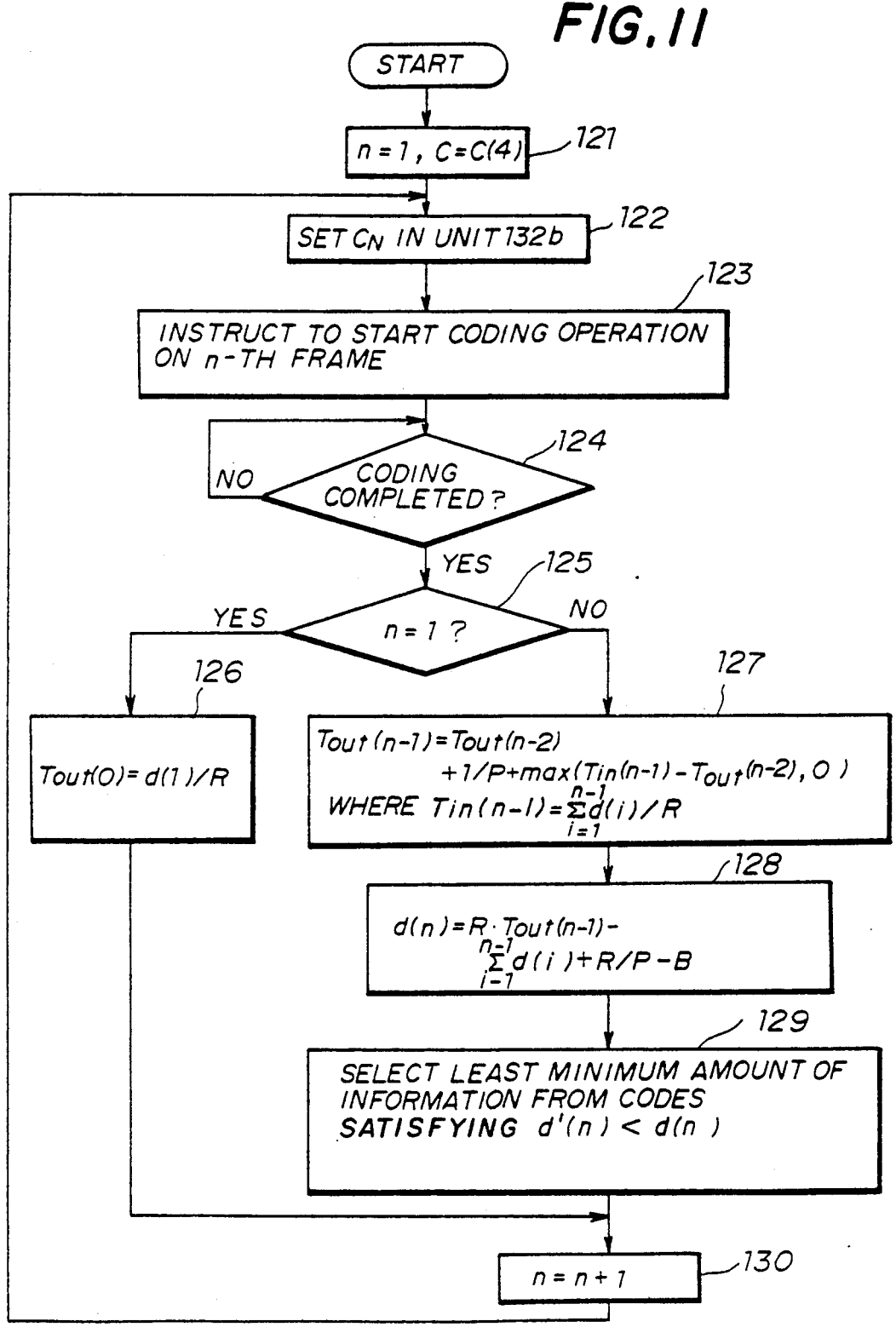

VIDEO SIGNAL CODING APPARATUS, CODING METHOD USED IN THE VIDEO SIGNAL CODING APPARATUS AND VIDEO SIGNAL CODING TRANSMISSION SYSTEM HAVING THE VIDEO SIGNAL CODING APPARATUS

BACKGROUND OF THE INVENTION

The present invention generally relates to a video signal coding apparatus, a coding method used in the video signal coding apparatus and a video signal coding transmission system having the video signal coding apparatus. More particularly, the present invention is concerned with a control of a buffer memory provided in a video signal coding apparatus in which the buffer memory is controlled in asynchronism with a buffer memory provided in a video signal decoding apparatus. Furthermore, the present invention is related to a coding method used in such a video signal coding apparatus, and a video signal coding apparatus.

Generally, systems which encode a video signal at a high efficiency are classified into a system in which a buffer memory on the transmitter side operates in synchronism with a buffer memory on the receiver side, and a system in which the buffer memory on the transmitter side operates in asynchronism with that on the receiver side. In a synchronous control of buffer memories, a frame synchronizing signal (also referred to as a framing signal) and a clock signal are transmitted to the receiver side so that the buffers on the transmitter and receiver sides operate in synchronism with each other. The above-mentioned synchronous control of buffer memories can prevent the occurrence of a failure of the decoding operation, such as a receiver buffer overflow. On the other hand, an asynchronous control of buffer memories provides large degree of freedom in the design of the system configuration. However, in order to prevent the occurrence of a failure of the decoding operation, it is necessary to control the amount of information generated on the transmission side.

SUMMARY OF THE INVENTION

An object of the present invention is to provide an improved video signal coding apparatus capable of coding a video signal without causing a failure of the received signal decoding operation.

The above object of the present invention is achieved by a signal coding apparatus coupled, via a transmission path, to a receiver having a receiver buffer and a decoder, the signal coding apparatus comprising:

coding means for coding a signal and outputting information generated in a frame unit, the information being a coded signal;

buffer means, coupled to the coding means, for temporarily storing the information; and control means, coupled to the coding means, for controlling an amount of the information on the basis of a storage capacity of the receiver buffer and an amount of the information which is contained in a frame per a unit time.

Another object of the present invention is to provide a video signal coding transmission system having the above signal coding apparatus. This object of the present invention is achieved by a video signal coding transmission system, comprising:

a transmitter;
a receiver; and
a transmission path coupling the transmitter and the receiver, wherein the receiver comprising:

a receiver buffer coupled to the transmission path; and a decoder coupled to the receiver buffer, and wherein the transmitter comprising:

coding means for coding a video signal and outputting information generated in a frame unit, the information being a coded video signal;

buffer means, coupled to the coding means, for temporarily storing the information; and control means, coupled to the coding means, for controlling an amount of the information so that the amount of the information satisfies the following inequality:

$$d(n) \geq R \cdot \text{Tout}(n-1) - \sum_{i=1}^{n-1} d(i) + R/P - B$$

where B is an equivalent buffer capacity including the buffer capacity of the receiver buffer, P is a decoding frame rate of the decoder; Tout(n-1) is a time necessary to complete a coding operation on up to an (n-1)th frame by the coding means after starting the coding operation, R is a bit rate of the transmission path, d(i) is an amount of information generated in an i-th frame, and d(n) is an amount of information generated in an n-th frame.

Yet another object of the present invention is to provide a coding method used in the aforementioned video signal coding apparatus. This object of the present invention is achieved by a coding method used in a transmitter coupled, via a transmission line, to a receiver having a receiver buffer and a decoder, the transmitter having a coding unit and a transmitter buffer, the coding unit coding a signal and outputting information generated in a frame unit, the coding method comprising the steps of:

a) calculating an amount d(n) of information generated in an n-th frame;

b) calculating a lower limit amount d,(n) of information in the n-th frame;

c) determining whether the lower limit amount d'(n) of information calculated by the step (b) is greater than the amount d(n) of information calculated by the step (a); and d) adding a dummy code to the information output by the coding unit when the step (c) determines the lower limit amount d'(n) of information is greater than the amount d(n) of information so that the following inequality is satisfied:

$$d(n) \geq d'(n).$$

The above-mentioned object of the present invention is also achieved by a coding method used in a transmitter coupled, via a transmission line, to a receiver having a receiver buffer and a decoder, the transmitter having a coding unit and a transmitter buffer, the coding unit coding a signal and outputting information generated in a unit of frame, the coding method comprising the steps of:

a) calculating a lower limit amount d'(n) of information in the n-th frame;

b) selecting one variable code type from a plurality of variable code types defining respective amounts of information so that the one variable code type has the least amount of information of variable code types which satisfy $d(n) > d'(n)$ where $d(n)$ is an amount of information in an n-th frame; and c) controlling a code length of the information output by the coding unit so that the information has the least amount of information selected by the step (b).

BRIEF DESCRIPTION OF THE DRAWINGS

Other objects, features and advantages of the present invention will become more apparent from the following detailed description when read in conjunction with the accompanying drawings, in which:

FIG. 3 is a block diagram of the present invention;

FIG. 4 is a block diagram illustrating a first preferred embodiment of the present invention;

FIG. 5B is a block diagram illustrating the coder of FIG. 5A;

FIG. 5C is a block diagram illustrating the structure of the receiver buffer of FIG. 4;

FIG. 11 is a block diagram illustrating the operation of the second preferred embodiment of the present invention.

DESCRIPTION OF THE PREFERRED EMBODIMENTS

Figure 1:
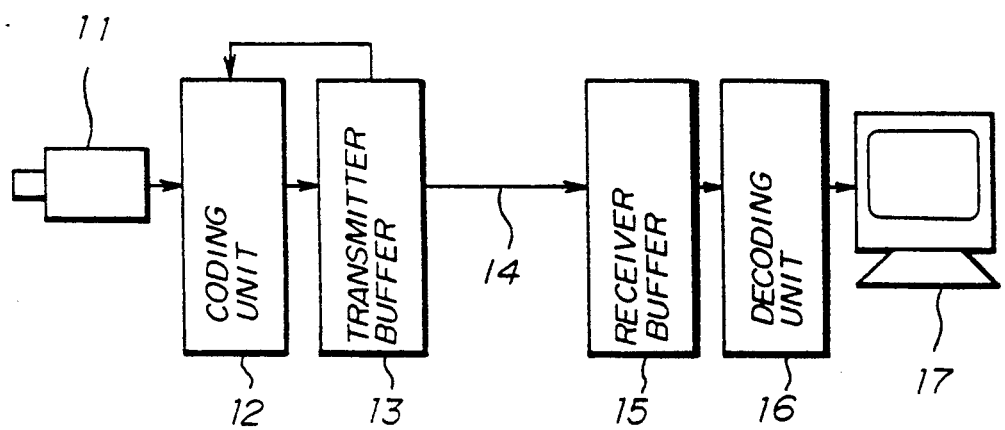
FIG. 1 is a block diagram of a video signal coding transmission system.

Referring to FIG. 1, there is illustrated a video signal coding transmission system. A television camera 11 outputs a video signal to a coding unit 12, which encodes the received video signal by an interframe coding process, a transform coding process (discrete cosine transform, for example), or the like, and generates a coded signal. A transmitter buffer 13 stores the coded signal and outputs it to a transmission path 14. A receiver buffer 15 receives the coded video signal via the transmission path 14, and outputs the same to a decoding unit 16, which decodes the coded video signal output from the receiver buffer 15 and reproduces the original video signal A display monitor 17 displays an image formed by the reproduced original video signal.

When the system shown in FIG. 1 is designed to asynchronously operate the transmitter and the receiver, it is necessary to provide a controller which controls the amount of information generated on the transmitter side so that the receiver does not fail to receive and decode the coded video signal.

In order to meet the above-mentioned requirement, it is conceivable to configure controller as follows. A model in which a buffer capacity of the receiver buffer 15 or an equivalent buffer capacity including the capacity of the receiver buffer 15 is divided into the capacity of a fixed buffer area, B, and the capacity of a variable buffer area, X. Data of one coded frame which is being decoded is stored in the variable buffer having the capacity X. On the other hand, the received data which is waiting for the decoding operation is stored in the fixed area having the capacity B. When the decoding process on the coded frame in the variable area is completed, the next one frame is transferred to and written into the fixed area.

It is now assumed that the decoding frame rate (frame per second) is P, and the time necessary to complete the decoding operation on one coded frame after starting the decoding operation is 1/P (second). The controller is designed so that the number of bits of the coded frame, d, being processed satisfies the following inequality:

$$d \geq [(n+1)R/P] - B - D(n) \qquad (1)$$

where R is the bit rate (bits per second) of the transmission path 14, and $D(n)$ is the number of bits which was needed to code data from the first frame ($n=1$) to the immediately previous frame ($n-1$).

Figure 2:
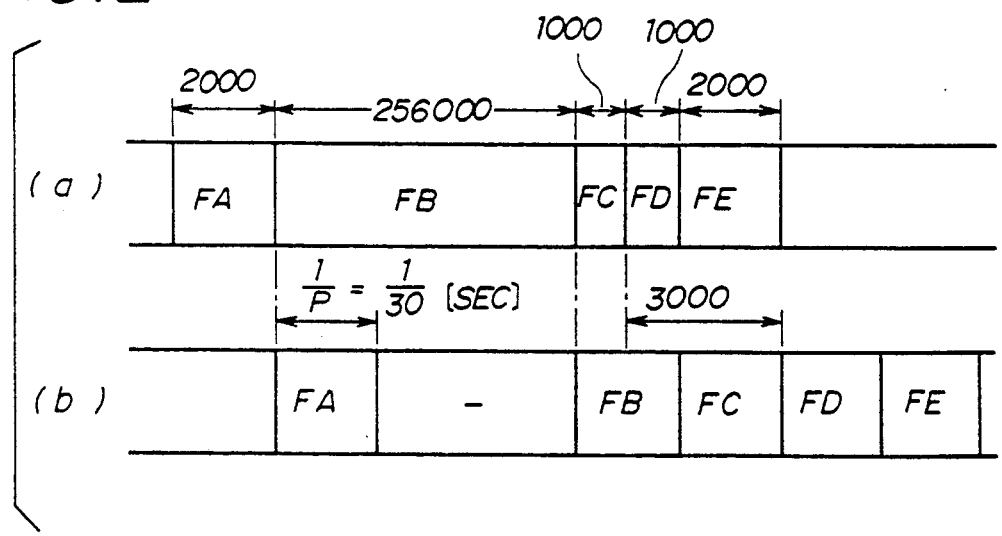
FIG. 2 is a diagram illustrating a conceivable operation of a receiver buffer shown in FIG.1.

However, there is a possibility that the received signal decoding operation fails even when the coding unit 12 is controlled so as to satisfy the inequality (1). For example, assuming that B (capacity of the fixed buffer area) = 2,000 bits, R (transmission bit rate) = 60,000 bits per second, and P (the bit rate of the reproduced frame) 30 frames per second, a case as shown in FIG. 2(a) is permitted in which a frame FA consists of 2,000 bits, a frame FB consists of 256,000 bits, frames FC and FD respectively consist of 1,000 bits, and a frame FE consists of 2,000 bits. That is, the frame FA satisfies the inequality (1) when $n=0$ and $D(0)=0$:

$$d \geq [(0+1)/P]R - B - D(0) = 0.$$

That is, $d \geq 0$. In this case, the frame FA consists of 2,000 bits, and thus satisfies the inequality (1).

The frame FB satisfies the inequality (1) when $n=1$:

$$d \geq 2R/P - B - D(1) = 2 \times 60,000/30 - 2,000 - 2,000 = 0.$$

That is, $d \geq 0$. The frame FB consists of 256,000 bits, and thus satisfies the inequality (1).

The frame FC satisfies the inequality (1) when $n=1$:

$$d \geq 2R/P - B - D(1) = 2 \times 60,000/30 - 2,000 - 256,000$$
$$= -254,000.$$

The frame FC also satisfies the inequality (1) when $n=2$:

$$d \geq 3R/P - B - D(2) = -245,000.$$

That is, $d \geq -254,000$ for $n=1$ or 2. The frame FC consists of 1,000 bits, and thus satisfies the inequality (1).

The inequality (1) related to the frame FD is as follows:

For $n=1$:

$$d \geq 2R/P - B - D(1) = 1,000.$$

For $n=2$, $$d \geq 3R/P - B - D(2) = -253,000.$$

For n = 3, $$d \geq 4R/P - B - D(3) = -254,000.$$

Thus, $d \geq 1,000$. The frame FD consists of 1,000 bits, and thus satisfies the inequality (1).

The inequality (1) related to the frame FE is as follows.

For n = 1, $$d \geq 2R/P - B - D(1) = 1,000.$$

For n = 2, $$d \geq 3R/P - F - D(2) = 2,000.$$

For n = 3, $$d \geq 4R/P - B - D(3) = -252,000.$$

For n = 4, $$d \geq 5R/P - B - D(4) = -253,000.$$

Thus, $d \geq 2,000$. The frame FE consists of 2,000 bits and thus satisfies the inequality (1).

However, it should be noted that data to be stored in the fixed buffer area having the capacity B immediately after the procedure for reading out the data of the frame FC from the fixed buffer area ends are data in the consecutive frames FD and FE. The total capacity of the frames FD and FE is equal to 3,000 bits, which is greater than the capacity B (equal to 2,000 bits) of the fixed buffer area. Thus, the fixed buffer area overflows and the received data decoding operation fails.

The present invention is directed to overcoming the above-mentioned problem. For this purpose, the present invention controls the difference between the time necessary to write data related to n consecutive frames into the receiver buffer and the time necessary to read out the data from the receiver buffer in order to prevent the occurrence of a failure of the received signal decoding operation on the receiver side.

Referring to FIG. 3, there is illustrated a video signal coding transmission system according to a preferred embodiment of the present invention. A transmitter 100 is composed of a controller 21, a coding unit 22 and a transmitter buffer 23. A receiver 200 is composed of a receiver buffer 24, a decoding unit 25 and a controller 26. The transmitter 100 and the receiver 200 are coupled to each other via a transmission path shown by the broken line. The controller 21 of the transmitter 100 controls the amount of data to be transmitted on the basis of the capacity of the receiver buffer 24 and the amount of data per a unit time. More specifically, the controller 21 controls the coding unit 22 so that the amount d(n) of information which is to be generated in the n-th coded frame satisfies the following inequality:

$$d(n) \geq R \cdot Tout(n-1) - \sum_{i=1}^{n-1} d(i) + R/P - B \quad (2)$$

where B is the equivalent buffer capacity including the capacity of the receiver buffer 24, P is the decoding frame bit rate of the decoding unit 25, Tout(n-1) is the time it takes to complete the decoding operation up to the (n-1)th frame after starting the decoding operation (or transmission), R is the bit rate of the transmission path, and d(i) is the amount of information in the i-th decoded frame.

It is now assumed that Tin(n) indicates the time necessary to write all data up to the n-th frame from t=0 into the receiver buffer 24, and Tout(n) indicates the time necessary to complete the decoding operation on all the data up to the n-th frame from t=0. The difference between the time Tin(n) and the time Tout(n) satisfies either formula (3) or formula (4), depending on when the decoding operation on data in the (n-1)th frame is completed.

$$Tout(n) = Tin(n) + (1/P) \quad (3)$$

$$Tout(n) = Tout(n-1) + (1/P) \quad (4)$$

Thus, an absolute delay time between the inputting and outputting of data in the n-th frame is obtained in the case where the formula (3) is used.

$$Tout(n) - Tin(n) = 1/P \quad (5)$$

Similarly, an absolute delay time between the inputting and outputting of data in the n-th frame is obtained in the case where the formula (4) is used.

$$Tout(n) - Tin(n) = Tout(n-1) - Tin(n) + (1/P) \quad (6)$$

The controller 21 of the transmitter 100 controls the coding unit 22 so that the absolute delay time (Tout(n) − Tin(n)) obtained for each frame is always equal to or less than a predetermined threshold value. That is, $$Tout(n) - Tin(n) \geq D \quad (7)$$

where D is a permitted delay time. When the condition defined by the inequality (7) is applied to the equation (3), the following is obtained:

$$1/P \leq D \quad (8)$$

When the condition defined by the inequality (7) is applied to the equation (4), the following is obtained:

$$Tout(n-1) - Tin(n) + (1/P) \leq D \quad (9)$$

It will be noted that it takes at least 1/P seconds to complete the decoding operation on data after inputting it. Thus, the inequality (8) indicates that the lower limit of the delay time D is equal to 1/P.

It is possible to write the time Tin(n) as follows:

$$Tin(n) = \sum_{i=1}^{n} d(i)/R \quad (10)$$

By inserting the equation (10) into the inequality (9), d(n) is obtained as follows:

$$d(n) > R \cdot Tout(n-1) - \sum_{i=1}^{n-1} d(i) + R/P - R \cdot D \quad (11)$$

Since the term R.D means the buffering of data which cannot be processed by the receiver 200, R.D=B and therefore the inequality (11) is rewritten as follows:

$$d(n) \geq R \cdot \text{Tout}(n - 1) - \sum_{i=1}^{n-1} d(i) + R/P - B \quad (12)$$

the inequality (12) is the same as the aforementioned inequality (2). The controller 21 controls the coding unit 22 on the basis of the equality (12), so that it becomes possible to prevent the occurrence of a failure of the received signal decoding operation of the receiver 200.

A further description will now be given of the system of FIG. 3, with reference to FIG. 4. The transmitter 100 is composed of a frame memory 31, a coding unit 32, a transmitter buffer 33, a controller 34 and an information amount counter 35. The controller 34 is formed of, for example, a microcomputer having a processor, a random access memory and a read only memory. The receiver 200 is composed of a receiver buffer 37, a decoding unit 38, a frame memory 39 and a controller 40. The transmitter 100 and the receiver 200 are coupled to each other via a transmission path 36 illustrated by the broken line.

A video signal supplied from, for example, a video camera, is input to the frame memory 31. The frame memory 31 has a first area used for storing the video signal from the video camera, and a second area used for reading out the video signal therefrom and outputting it to the coding unit 32. The controller 34 outputs an area switching control signal (a) to the frame memory 31. The area switching control signal (a) indicates whether the first area or the second area should be used. The controller 34 outputs a coding control signal (b) to the coding unit 32. The coding control signal (b) causes the coding unit 32 to start the coding operation. In response to the coding control signal (b), the coding unit 32 starts to read out the video signal to a high-efficiency coding process, such as an interframe coding process or a discrete cosine transform. A coded video signal or coded data is applied to the transmitter buffer 33 and the information amount counter 35. controller 34. The occupied area information signal (f) indicates how much the entire area of the transmitter buffer 33 is presently filled with coded data. The controller 34 controls a quantization characteristic in the coding unit 32 on the basis of the occupied area information signal (f) in order to prevent an overflow or underflow from taking place in the transmitter buffer 33.

The information amount counter 35 is reset in response to a preset signal (d) generated and output by the controller 34. After the information counter 35 is reset, it counts data output by the coding unit 32 and obtains the amount of information which has been generated. Then, the information amount counter 35 supplies the controller 34 with an information amount signal (e) representative of the obtained amount of information. The controller 34 controls the coding unit 32 so that the aforementioned equation (12) is satisfied. When a small amount of information is indicated by the information amount signal (e), the controller 34 outputs a dummy code output instruction signal (c) to the coding unit 32. The coding unit 32 adds a dummy code consisting of a plurality of dummy bits to the coded data (between two consecutive frames), so that a predetermined amount of information generated in one frame is ensured. The dummy code is formed of an arbitrary code having its identification, for example. Thereby, coded data with the dummy code is transmitted to the receiver 200 via the transmission path 36 at a constant bit rate.

The receiver buffer 37 of the receiver 200 temporarily stores the coded data received from the transmitter 100 via the transmission path 36. The receiver buffer 37 counts the number of frames of the received data, and outputs a frame number signal (h) which is applied to the controller 40. The controller 40 supervises the counted number of frames at a 1/P interval (each time the decoding unit 38 completes the decoding operation). When $h \leq 1$, the controller 40 outputs a decoding start signal (i) to the decoding unit 38. When $h=0$, the controller 40 waits for the occurrence of the situation in which the counted number of frames becomes equal to 1. When the frame number signal (h) indicates $h=1$, the controller 40 outputs the decoding start signal (i).

In response to the decoding start signal (i), the decoding unit 38 reads out data amounting to one frame from the receiver buffer 37, and decodes the one-frame data. The decoding unit 38 writes a decoded video signal into the frame memory 39. The frame memory 39 has a first area into which the decoded video signal is written, and a second area used for reading out the decoded video data and outputting it to a monitor or the like (not shown).

Figure 5A:
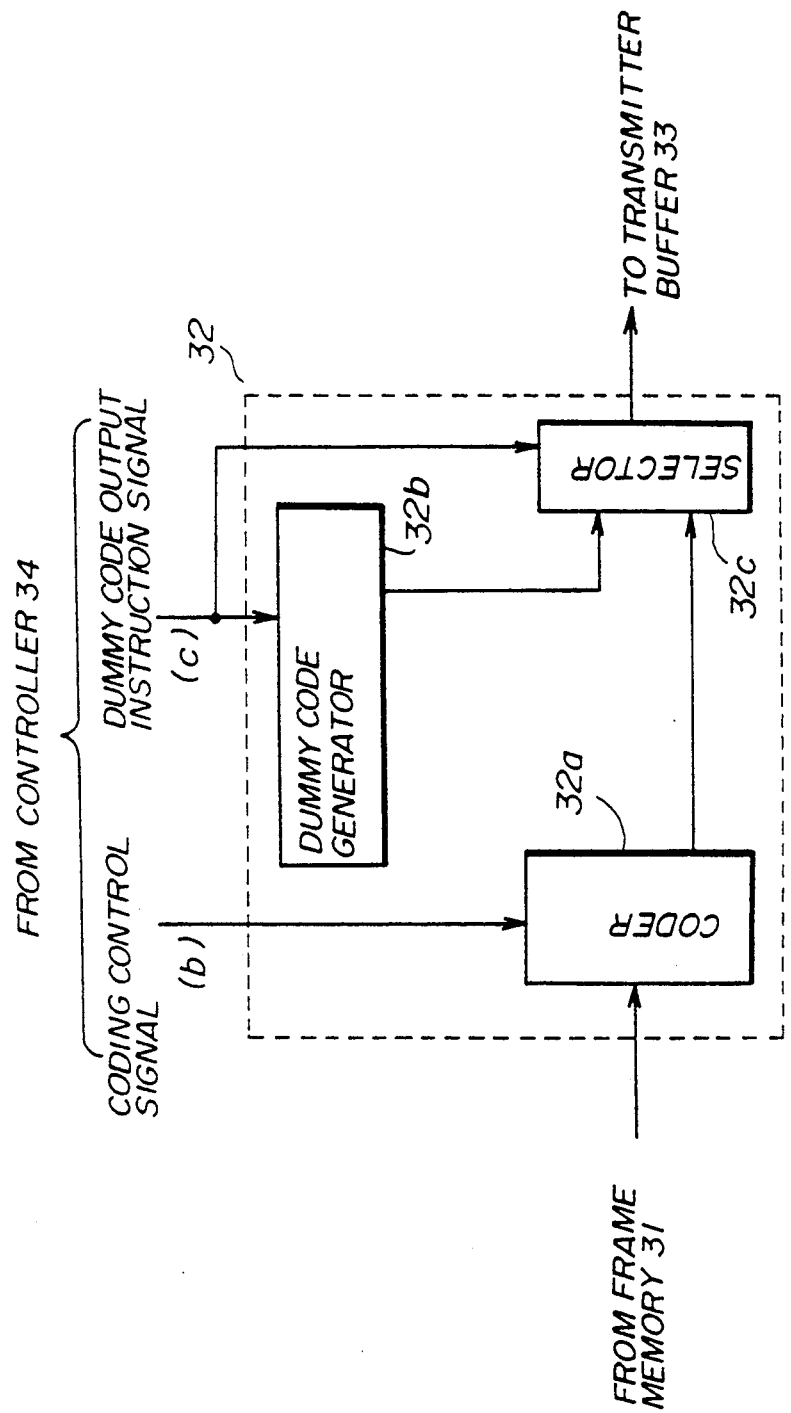
FIG. 5A is a block diagram illustrating the coding unit of FIG. 4.

FIG. 5A is a block diagram illustrating the structure of the coding unit 32 of FIG. 4. The coding unit 32 is composed of a coder 32a, a dummy code generator 32b and a selector 32c. The coder 32a starts the coding operation in response to the coding control signal (b) generated and output by the controller 34 (FIG. 4). The dummy code generator 32b generates the dummy code in response to the dummy code output instruction signal (c). In response to the dummy code output instruction signal (c), the selector 32c selects the dummy code. When the selector is not supplied with the dummy code output instruction signal (c), the selector selects the coded data output from the coder 32a.

FIG. 5B is a block diagram of the coder 32a of FIG. 5A. The coder 32a is composed of a source coding unit 32a-1 and a variable length coding unit 32a-1. The source coding unit 32a-1 is formed of, for example, a quantizer. The variable length coding unit 32a-2 is formed of, for example, a predictive coding unit, which calculates a difference (residual signal) between data related to two consecutive frames and quantizes the difference.

FIG. 5C illustrates the configuration of the receiver buffer 37 of FIG. 4. The receiver buffer 37 has a fixed area having capacity X, and a variable area having capacity B.

A description will now be given of the operation of the system of FIG. 4 with reference to FIG. 6. The controller 34 sets the value in a counter n (software or hardware program) indicating the frame number to 1 at step 101. Further, a counter for counting the amount of information on the basis of the information amount signal (e) is reset. Then, the controller 34 outputs the coding control signal (b) to the coding unit 32 at step 102. In response to the coding control signal (b), the coding unit 32 starts to encode data in the n-th frame (initially, $n=1$). The controller 34 supervises the coding unit 32 at the predetermined intervals, and determines, at step 103, whether or not the coding operation on the data in the n-th frame is completed. When the result obtained at step 103 is YES at step 104, the controller 34 receives the information amount signal (e) output by the information amount counter 35, and obtains the amount d(n) of information (coded data) in the n-th frame. At step 105, the controller 34 judges whether or not n=1. When it is determined that n=1, that is, when it is determined that the frame being processed is the first frame, at step 106, the controller 34 calculates the time Tout(0) by the following formula:

$$Tout(0)=d(1)/R.$$

Further, at step 106, the controller 34 stores the calculated time Tout(0) in an internal memory such as a RAM (not shown for the sake of simplicity). At step 112, the controller 34 increments the value in the counter n by 1. Then, the procedure returns to step 102.

When it is determined, at step 105, that n is not equal to 1, at step 107, the controller 34 calculates the time Tout(n-1) by the following formula and stores the calculated time Tout(n-1) in the internal memory:

$$Tout(n-1) = Tout(n-2) + 1/P + \max[Tin(n-1) - Tout(n-2), 0] \quad (13)$$

where:

$$Tin(n-1) = \sum_{i=1}^{n-1} (d(i)/R).$$

A step 108 subsequent to step 107, the controller 34 calculates a lower limit information amount d'(n) by the following formula and stores the calculated lower limit information amount d'(n) in the internal memory:

$$d'(n) = R \cdot Tout(n-1) - \sum_{i=1}^{n-1} d(i) + R/P - B.$$

At step 109, the controller 34 judges whether or not the lower limit information amount d'(n) is greater than the amount of generated information related to the n-th frame. When it is determined that d'(n)>d(n), the controller 34 increments the counter value n by 1 at step 112, and executes step 102. On the other hand, when it is determined, at step 109, that d'(n)≦d(n), the controller 34 outputs the dummy code output instruction signal (c) to the dummy code generator 32b (FIG. 5A) and the selector 32c. In this case, the dummy code output instruction signal (c) shows that a dummy code amounting to C bits should be output. The dummy code generator 32b generates the dummy code amounting to C bits, which is allowed to pass through the selector 32c (FIG. 5A). In this case, C is selected so that it is greater than (d'(n)−d(n)). Thus, the amount of information generated in n-th frame is equal to d(n)+C (step 111). At step 112, the controller 34 executes step 112 at which step n is incremented by 1.

Figure 7:
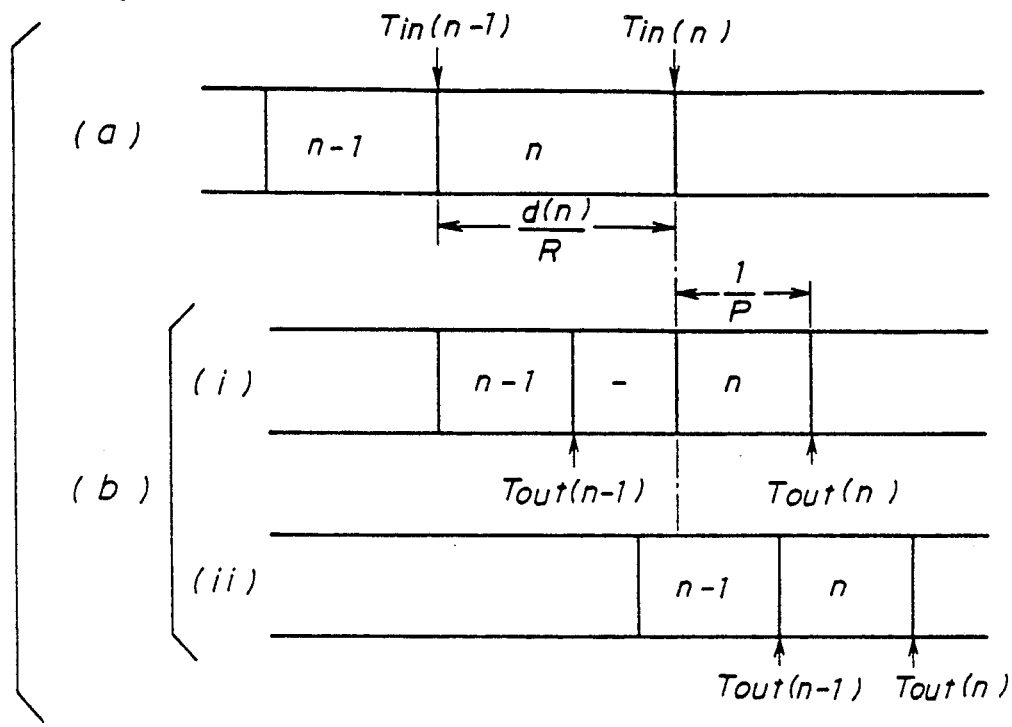
FIG. 7 is a diagram illustrating input and output operations of the receiver buffer of FIG. 4.

FIG. 7 illustrates input and output operations of the receiver 37 of FIG. 4. FIG. 7(a) illustrates the input operation, and FIG. 7(b) illustrates the output operation. In FIG. 7(a), Tin(n-1) is the time when the inputting of data in the (n-1)th frame to the receiver buffer 37 is completed, and Tin(n) is the time when the inputting of data in the n-th frame to the receiver buffer 37 is completed. FIG. 7(b)-(i) illustrates a case where the decoding of data in the (n-1)th frame is completed when data in the n-th frame is being received. FIG. 7(b)-(ii) illustrates a case where the decoding of data in the (n-1)th frame is completed after the receiving of data in the n-th frame is completed. In FIG. 7(b)-(i), Tout(n) at which the decoding of the data in the n-th frame is completed is based on the equation (3). In FIG. 7(b)-(ii), Tout(n) at which the decoding of the data in the n-th frame is completed is based on the equation (4).

Figure 8:
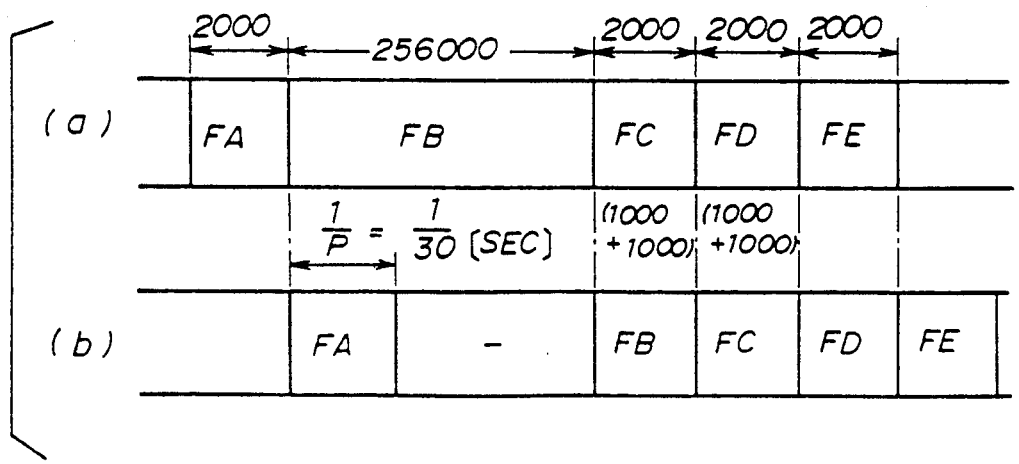
FIG. 8 is a diagram illustrating the operation of the receiver buffer of FIG. 4.

FIG. 8 illustrates the operation of the receiver buffer 37. In FIG. 8, it is assumed that the capacity B of the fixed area including the receiver buffer 37 is equal to 2,000 bits, the transmission bit rate R is equal to 60,000 bits per second, and the reproduced frame rate P is equal to 30 frames per second. Under these conditions, FIG. 8 will be compared to FIG. 2.

The time Tout(0) related to the frame FA (first frame) shown in FIG. 8 is as follows:

$$Tout(0)=d(1)/R$$

$$d(1) \geq R \cdot Tout(0) - D(0)$$

In this case, (R/P)=B. Thus, D(0)≧0, and therefore there is no limit of the amount of information generated in the frame FA.

The time Tout(1) related to the frame FB shown in FIG. 8 is as follows:

$$Tout(1) = Tout(0) + \max[Tin(1) - Tout(0), 0]$$
$$= 1/15 \text{ (seconds)}$$
$$d(2) \geq R \cdot Tout(1) - D(1) = 60{,}000 \times (1/15) - 2{,}000$$
$$= 2{,}000.$$

Since the frame FB consists of 256,000 bits, the condition is satisfied.

The time Tout(2) related to the frame FC shown in FIG. 8 is as follows:

$$Tout(2) = Tout(1) + (1/P) + \max[Tin(2) - Tout(1), 0]$$
$$= 1/15 + 1/30 + 258{,}000/60{,}000 - 1/15$$
$$= 130/30$$

$$d(3) \geq R \cdot Tout(2) - D(2) = 60{,}000 \times (130/30) - 258{,}000$$
$$= 2000.$$

If the frame FC consists of 1,000 bits, a dummy code consisting of 1,000 dummy bits is added to the frame FC, so that the condition, d(3)≦2,000 is satisfied.

The time Tout(3) related to the frame FD of FIG. 8 is as follows:

$$Tout(3) = Tout(2) + (1/P) + \max[Tin(3) - Tout(2), 0]$$
$$= 130/30 + (1/30)$$
$$= 131/30$$

$$d(4) \geq R \cdot Tout(3) - D(3) = 60{,}000 \times (131/30) - 260{,}000$$
$$= 2000.$$

If the frame FD consists of 1,000 bits, a dummy code consisting of 1,000 bits is added to the frame FD, so that the condition, d(4)≧2,000 is satisfied.

The time Tout(4) related to the frame FE shown in FIG. 8 is as follows:

$$Tout(4) = Tout(3) + (1/P) + \max[Tin(4) - Tout(3), 0]$$
$$= 131/30 + 1/30$$
$$= 132/30$$

$$d(5) \geq R \cdot Tout(4) - D(4) = 60{,}000 \times (132/30) - 262{,}000$$
$$= 2000.$$

As described above, the occupied area of the receiver buffer 37 obtained immediately after the data in each of the frames FA-F3 is respectively read out from the receiver buffer 37 is always equal to or less than 2,000 bits. Thus, there is no possibility that an overflow occurs under the same condition as FIG. 2. Thus, it becomes possible to prevent the occurrence of a failure of the received signal decoding operation on the side of the receiver 200.

Figure 9:
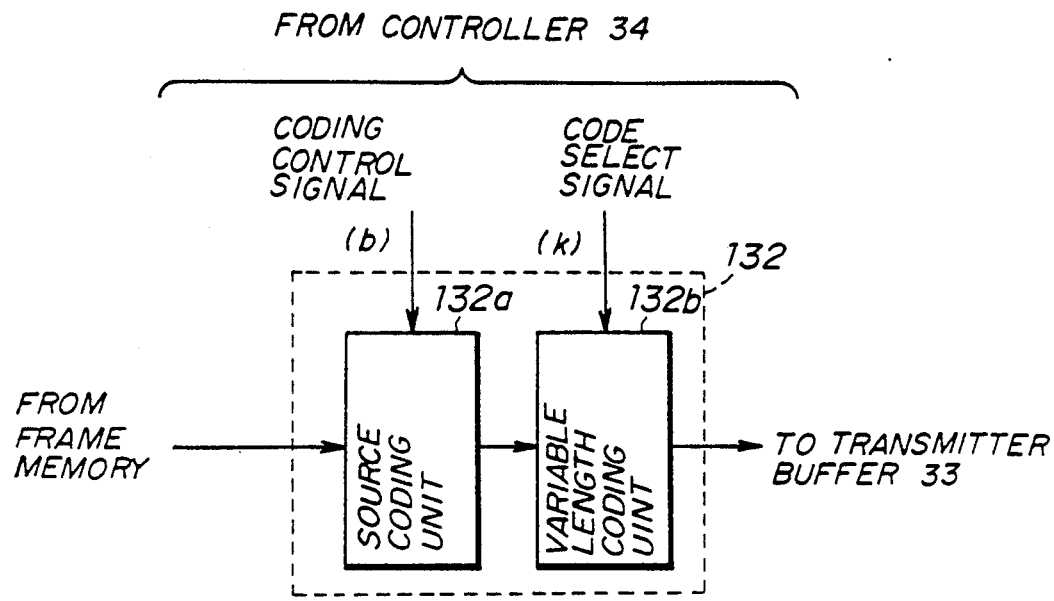
FIG. 9 is a block diagram illustrating a coding unit according to a second preferred embodiment of the present invention.

A description will be given of a second preferred embodiment of the present invention with reference to FIGS. 9 through 11. The second embodiment of the present invention is configured by replacing the coding unit 32 shown in FIGS. 4 and 5A by a coding unit 132 of FIG. 9 and modifying the controller 34 so that it outputs a code select signal (k) in place of the dummy code output instruction signal (c). The coding unit 132 of FIG. 9 employs a coding algorithm in which a code is allotted in a unit of pixel and the allotted code is selected from among predetermined codes respectively having different minimum code lengths, as shown in Table 1.

TABLE 1

| Code name | Min code length (bits) | Minimum amount of information (bits) = d(n) |
|---|---|---|
| C(1) | 2 | 400,000 |
| C(2) | 3 | 600,000 |
| C(3) | 4 | 800,000 |
| C(4) | 5 | 10,000,000 |

In Table 1, the number of pixels in one frame is equal to 200,000. As in the case of the first embodiment of the present invention which has been described previously, the controller 34 calculates the minimum amount d'(n) of information in the frame to be next processed after the coding of information in the frame being processed is completed (or before starting the coding). Then, the controller 34 determines whether or not d'(n)<d(n), and outputs the code select signal (k) to the variable length coding unit 132b on the basis of the comparison result.

Figure 10:
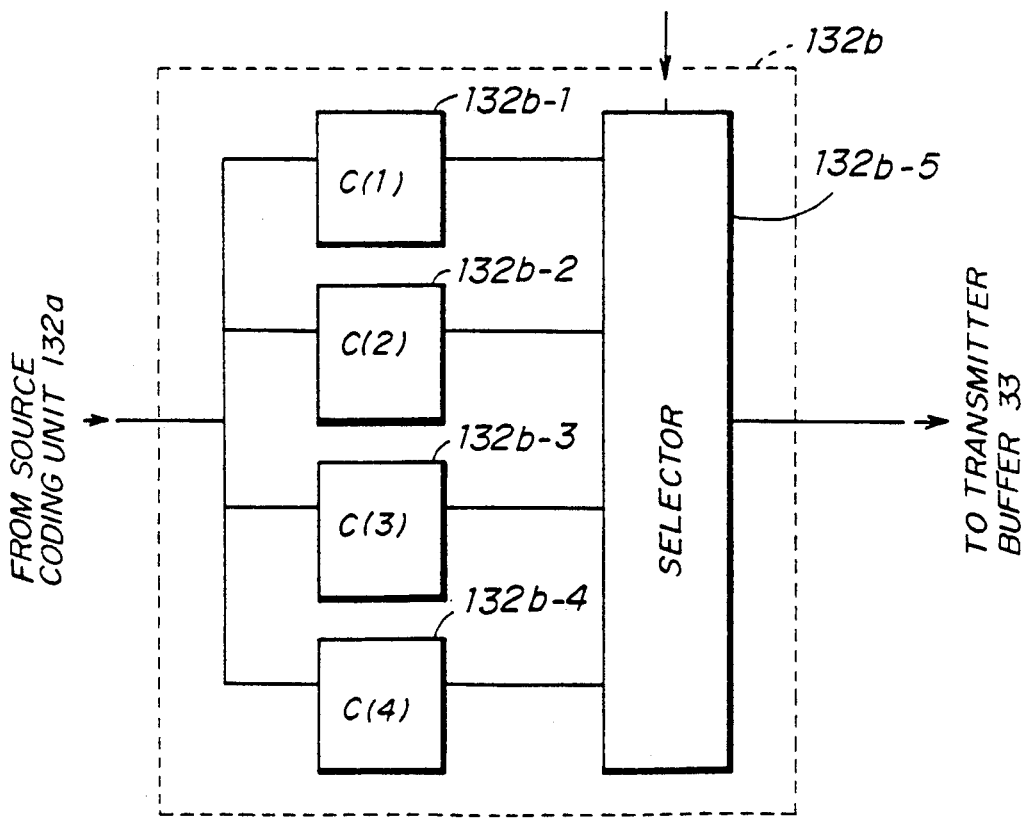
FIG. 10 is a block diagram of a variable length coding unit of FIG. 9.

Referring to FIG. 10, the variable length coding unit 132b is composed of code tables 132b-1, 132b-2, 132b-3 and 132b-4 related to the codes C(1) C(2), C(3) and C(4), respectively, as well as a selector 132b-5. The code tables 132b-1 through 132b-4 receive quantized information from the source coding unit 132a (FIG. 9) and output the codes having the respective minimum code lengths. The selector 132b-5 is supplied with the code select signal (k) generated and output by the generator 34.

The code select signal (k) is generated based on the result of the comparison operation for determining whether or not d'n<d(n). The code select signal (k) causes the selector 132b-5 to select the code having the least minimum amount of information in one frame from among the codes which satisfy d'(n)<d(n). The selected coded is used for encoding the next frame. For example, when d'(n)=700,000 bits, the code C(3) is used for coding the next frame. By using the above-mentioned control procedure, it becomes possible to prevent the occurrence of a failure of the received signal decoding operation of the receiver 200 (FIG. 4).

Referring to FIG. 11, there is illustrated the operation of the controller 34 for realizing the above-mentioned control procedure. After the controller 34 starts the procedure of FIG. 11, it executes step 121, at which step it sets the counter value n equal to 1, and sets the code select signal (k) so that the selector 132b-5 selects the code table C(4). Hereafter, the code table indicated by the code select signal (k) is indicated by $C_N$ (N=1, 2, 3, 4). At step 122, the controller 34 instructs the selector 132b-5 to select the code $C_N$ (initially, C(4) is selected).

At step 123, the controller 34 outputs the coding control signal (b) to the source coding unit 132a so that the coding of data in the n-th frame is started. At step 124, the controller 34 determines whether or not the coding is completed. When the result at step 124 is YES, the controller 34 determines, at step 125, whether or not n=1. When n =1, the controller 34 executes step 126, which is the same as the aforementioned step 106 (FIG. 6). After that, at step 130, the controller 34 increments n by 1.

Figure 6:
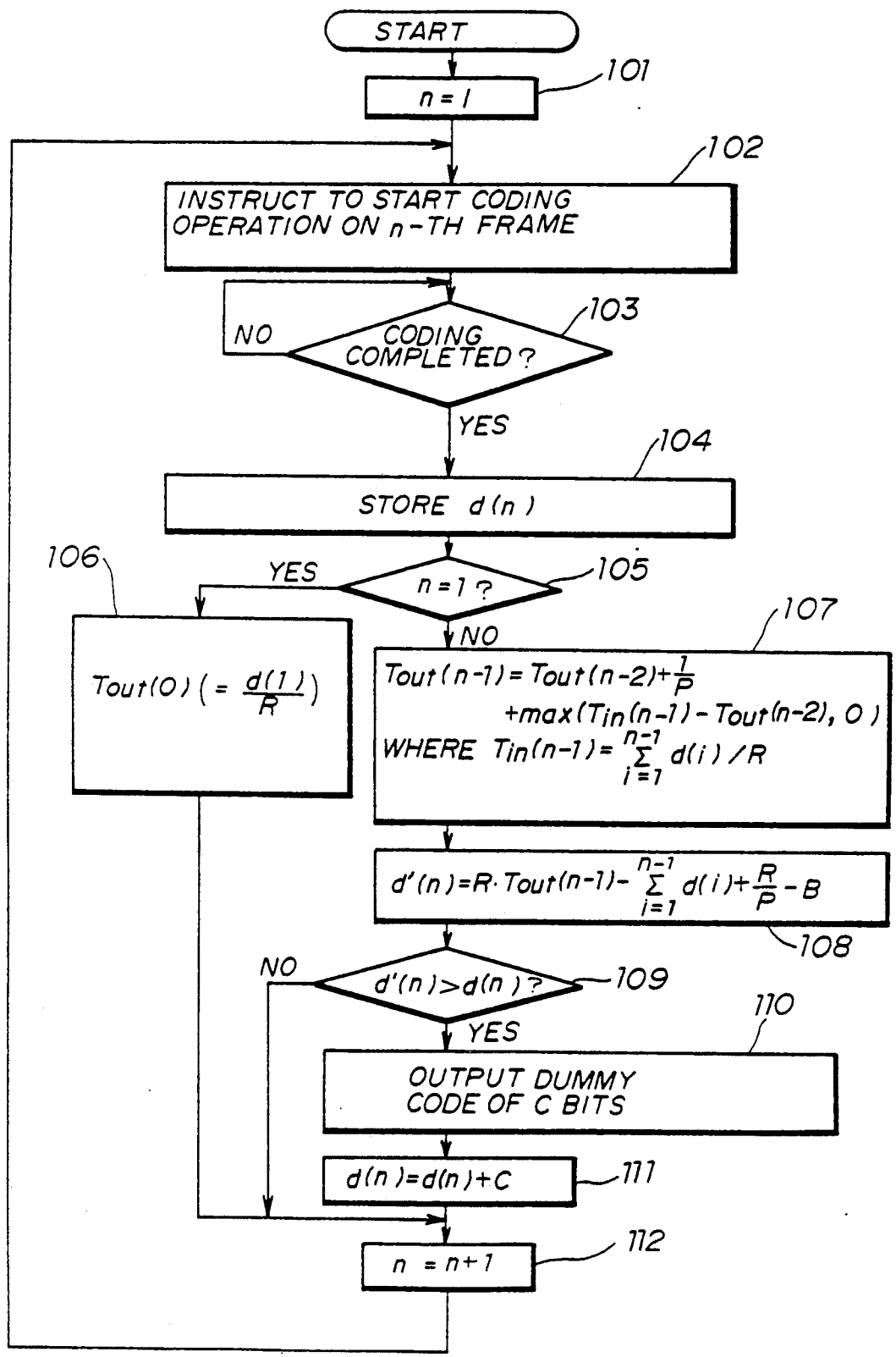
FIG. 6 is a flowchart illustrating the operation of the controller of FIG. 4.

On the other hand, when it is determined, at step 125, that n is not equal to 1, the controller 34 executes step 127, which is the same as the aforementioned step 107 (FIG. 6). Then, the controller 34 executes step 128, which is the same as the aforementioned step 108 (FIG. 6). At step 129, the controller 34 determines whether or not d'(n)<d(n), and stores the code having the least minimum code length among the codes satisfying d'(n)<d(n). After that, the controller 34 executes the step 130.

The present invention is not limited to the specifically disclosed embodiments, and variations and modifications may be made without departing from the scope of the present invention.

What is claimed is:

1. A signal coding apparatus coupled, via a transmission path, to a receiver having a receiver buffer and a decoder, said signal coding apparatus comprising:
   coding means for coding a signal including a video signal, and outputting information generated in a frame unit, said information being a coded signal;
   buffer means, coupled to said coding means, for temporarily storing said information; and
   control means, coupled to said coding means, for controlling an amount of said information on the basis of a storage capacity of said receiver buffer and an amount of said information which is contained in a frame per a unit of time.

2. A signal coding apparatus as claimed in claim 1, wherein said control means comprises:
   first means for calculating a first time necessary to write said information related to n consecutive frames into said receiver buffer where n is an integer;
   second means for calculating a second time necessary to read said information related to said n consecutive frames from said receiver buffer; and
   third means, coupled to said first and second means, for controlling the amount of said information so that a difference between said first time and said second time is equal to or less than a predetermined threshold time.

3. A signal coding apparatus as claimed in claim 1, further comprising:
   dummy code generating means for generating a dummy code and for inserting said dummy code between two consecutive frames.

4. A signal coding apparatus as claimed in claim 3, further comprising:
   selector means for selecting either said information generated by said coding means or said dummy code generated by said dummy code generating means on the basis of the storage capacity of said receiver buffer and the amount of said information which is contained in the frame per the unit of time.

5. A signal coding apparatus as claimed in claim 1, further comprising:

variable code length coding means for controlling a code length of said information on the basis of the storage capacity of said receiver buffer and the amount of said information which is contained in the frame per unit of time, said code length of the information corresponding to the amount of said information.

6. A signal coding apparatus as claimed in claim 5, wherein said coding means comprises:
   table means for defining a plurality of variable code types defining respective amount of information; and
   selector means, coupled to said table means, for selecting one of said plurality of variable code types on the basis of the storage capacity of said receiver buffer and the amount of said information which is contained in the frame per the unit of time and for outputting said information having a corresponding one of the amounts of information defined in said table means to said receiver.

7. A signal coding apparatus as claimed in claim 1, wherein said coding means comprises:
   quantizer means for quantizing said signal into a quantized signal; and
   variable code length coding means, coupled to said quantizer means, for coding said quantized signal into said information having a variable code length.

8. A signal coding apparatus as claimed in claim 1, wherein said control means comprises:
   means for controlling said coding means so that the amount of said information satisfies the following inequality:

$$d(n) \geqq R \cdot Tout(n - 1) - \sum_{i=1}^{n-1} d(i) + R/P - B$$

where B is an equivalent buffer capacity including the buffer capacity of said receiver buffer, P is a decoding frame rate of said decoder, Tout(n-1) is a time necessary to complete a coding operation up to an (n-1)th frame by said coding means after starting said coding operation, R is a bet rate of said transmission path, d(i) is an amount of information generated in an i-th frame, and d(n) is an amount of information generated in an n-th frame.

9. A signal coding apparatus as claimed in claim 8, further comprising:
   dummy code generating means for generating a dummy code and for inserting said dummy code between two consecutive frames so that said inequality is satisfied.

10. A signal coding apparatus as claimed in claim 8, further comprising:
    variable code length coding means for controlling a code length of said information so that said inequality is satisfied.

11. A signal coding apparatus coupled, via a transmission path, to a receiver having a receiver buffer and a decoder, said signal coding apparatus comprising:
    coding means for coding a signal and outputting information generated in a frame unit, said information being a coded signal;
    buffer means, coupled to said coding means, for temporarily storing said information;
    control means, coupled to said coding means, for controlling an amount of said information on the basis of a storage capacity of said receiver buffer and an amount of said information which is contained in a frame per a unit of time;
    variable code length coding means for controlling a code length of said information on the basis of the storage capacity of said receiver buffer and the amount of said information which is contained in the frame per the unit of time, said code length of the information corresponding to the amount of said information,
    said coding means including
       table means for defining a plurality of variable code types defining respective amounts of information; and
       selector means, coupled to said table means, for selecting one of said plurality of variable code types on the basis of the storage capacity of said receiver buffer and the amount of said information which is contained in the frame per the unit of time and for outputting said information having a corresponding one of the amounts of information defined in said table means to said receiver.

12. A video signal coding transmission system, comprising:
    a transmitter;
    a receiver; and
    a transmission path coupling said transmitter and said receiver,
    said receiver comprising:
       a receiver buffer coupled to said transmission path; and
       a decoder coupled to said receiver buffer; and
    said transmitter comprising:
       coding means for coding a video signal and outputting information generated in a frame unit, said information being a coded video signal;
       buffer means, coupled to said coding means, for temporarily storing said information; and
       control means, coupled to said coding means, for controlling an amount of said information so that the amount of said information satisfies the following inequality:

$$d(n) \geqq R \cdot Tout(n - 1) - \sum_{i=1}^{n-1} d(i) + R/P - B$$

where B is an equivalent buffer capacity including the buffer capacity of said receiver buffer, P is a decoding frame rate of said decoder, Tout(n-1) is a time necessary to complete a coding operation up to an (n-1)th frame by said coding means after starting said coding operation, R is a bit rate of said transmission path, d(i) is an amount of information generated in an i-th frame, and d(n) is an amount of information generated in an n-th frame.

13. A signal coding transmission system as claimed in claim 12, further comprising:
    dummy code generating means for generating a dummy code and for inserting said dummy code between two consecutive frames so that said inequality is satisfied.

14. A signal coding apparatus as claimed in claim 12, further comprising:
    variable code length coding means for controlling a code length of said information so that said inequality is satisfied.

15. A coding method used in a transmitter coupled, via a transmission path, to a receiver having a receiver buffer and a decoder, said transmitter having a coding unit and a transmitter buffer, said coding unit coding a signal and outputting information generated in a frame unit, said coding method comprising the steps of:
  a) calculating an amount d(n) of information generated in an n-th frame;
  b) calculating a lower limit amount a'(n) of information in the n-th frame;
  c) determining whether the lower limit amount d'(n) of information calculated by said (b) is greater than the amount d(n) of information calculated by said step (a); and
  d) adding a dummy code to said information output by said coding unit when said step (c) determines the lower limit amount d'(n) of information is greater than the amount d(n) of information so that the following inequality is satisfied:

d(n)≧d'(n).

16. A coding method as claimed in claim 15, wherein said step (b) comprises the step of calculating the following formula:

$$d'(n) = R \cdot Tout(n-1) - \sum_{i=1}^{n-1} d(i) + R/P - B$$

where b is an equivalent buffer capacity including the buffer capacity of said receiver buffer, P is a decoding frame rate of said decoder, Tout(n-1) is a time necessary to complete a coding operation up to an (n-1)th frame by said coding means after starting said coding operation, R is a bit rate of said transmission path, d(i) is an amount of information generated in an i-th frame, and d(n) is an amount of information generated in an n-th frame.

17. A coding method used in a transmitter coupled, via a transmission path, to a receiver having a receiver buffer and a decoder, said transmitter having a coding unit and a transmitter buffer, said coding unit coding a signal and outputting information generated in a frame unit, said coding method comprising the steps of:
  a) calculating a lower limit amount d'(n) of information in the n-th frame;
  b) selecting one variable code type from a plurality of variable code types defining respective amounts of information so that said one variable code type has the least amount of information of variable code types which satisfy d(n)>d'(n) where d(n) is an amount of information in an n-th frame; and
  c) controlling a code length of said information output by said coding unit so that said information has said least amount of information selected by said step (b).

18. A coding method as claimed in claim 17, wherein said step (a) comprises the step of calculating the following formula:

$$d'(n) = R \cdot Tout(n-1) - \sum_{i=1}^{n-1} d(i) + R/P - B$$

where B is an equivalent buffer capacity including the buffer capacity of said receiver buffer, P is a decoding frame rate of said decoder, Tout(n-1) is a time necessary to complete a coding operation up to an (n-1)th frame by said coding means after starting said coding operation, R is a bit rate of said transmission path, d(i) is an amount of information generated in an i-th frame, and d(n) is an amount of information generated in an n-th frame.

19. A transmission coding method, comprising the steps of:
  a) coding a signal to generate a coded signal;
  b) generating a frame to be transmitted, based on the coded signal; and
  c) generating and selectively inserting into the frame a dummy code with a variable bit length, said step of generating and selectively inserting, and said variable bit length being based on a time period which is necessary to code a plurality of previously transmitted frames, a number of bits included within the plurality of previously transmitted frames, a transmission rate of a transmission path, and a decoding rate of a receiver.

20. A signal coding apparatus coupled, via a transmission path, to a receiver having a receiver buffer and a decoder, said signal coding apparatus comprising:
  coding means for coding a signal and outputting information generated in a frame unit, said information being a coded signal;
  buffer means, coupled to said coding means, for temporarily storing said information;
  control means, coupled to said coding means, for controlling an amount of said information on the basis of a storage capacity of said receiver buffer and an amount of said information which is contained in a frame per a unit of time,
  said control means including
    first means for calculating a first time necessary to write said information related to n consecutive frames into said receiver buffer where n is an integer,
    second means for calculating a second time necessary to read said information related to said n consecutive frames from said receiver buffer, and
    third means, coupled to said first and second means, for controlling the amount of said information so that a difference between said first time and said second time is equal to or less than a predetermined threshold time.

21. A signal coding apparatus coupled, via a transmission path, to a receiver having a receiver buffer and a decoder, said signal coding apparatus comprising:
  coding means for coding a signal and outputting information generated in a frame unit, said information being a coded signal;
  buffer means, coupled to said coding means, for temporarily storing said information;
  control means, coupled to said coding means, for controlling an amount of said information on the basis of a storage capacity of said receiver buffer and an amount of said information which is contained in a frame per a unit of time;
  dummy code generating means for generating a dummy code and for inserting said dummy code between two consecutive frames; and
  selector means for selecting either said information generated by said coding means or said dummy code generated by said dummy code generating means on the basis of the storage capacity of said receiver buffer and the amount of said information which is contained in the frame per the unit of time.

22. A signal coding apparatus coupled, via a transmission path, to a receiver having a receiver buffer and a decoder, said signal coding apparatus comprising:

coding means for coding a signal and outputting information generated in a frame unit, said information being a coded signal;

buffer means, coupled to said coding means, for temporarily storing said information;

control means, coupled to said coding means, for controlling an amount of said information on the basis of a storage capacity of said receiver buffer and an amount of said information which is contained in a frame per a unit of time, said control means including means for controlling said coding means so that the amount of said information satisfies the following inequality:

$$d(n) \geq R \cdot Tout(n-1) - \sum_{i=1}^{n-1} d(i) + R/P - B$$

where B is an equivalent buffer capacity including the buffer capacity of said receiver buffer, P is a decoding frame rate of said decoder, Tout(n-1) is a time necessary to complete a coding operation up to an (n-1)th frame by said coding means after starting said coding operation, R is a bit rate of said transmission path, d(i) is an amount of information generated in an i-th frame, and d(n) is an amount of information generated in an n-th frame.

23. A signal coding apparatus as claimed in claim 22, further comprising:

dummy code generating means for generating a dummy code and for inserting said dummy code between two consecutive frames so that said inequality is satisfied.

24. A signal coding apparatus as claimed in claim 22, further comprising:

variable code length coding means for controlling a code length of said information so that said inequality is satisfied.

25. A transmission coding method comprising the steps of:

a) coding a signal to generate a coded signal;

b) generating a frame unit including a first amount of the coded signal, the first amount being determined based on a storage capacity of a receiver buffer which is to receive the frame unit, and on a second amount of a coded signal previously transmitted to the receiver buffer.

26. A transmission coding method as claimed in claim 25, wherein the first amount of said step (b) is also determined based on a bit rate of a transmission path upon which the frame unit is sent to the receiver buffer.

27. A transmission coding method as claimed in claim 25, wherein the first amount of said step (b) is also determined based on a decoding rate of a decoder associated with the receiver buffer.

* * * * *

UNITED STATES PATENT AND TRADEMARK OFFICE
CERTIFICATE OF CORRECTION

PATENT NO. : 5,235,618  
DATED : August 10, 1993  
INVENTOR(S) : Kiyoshi SAKAI et al.

Page 1 of 3

It is certified that error appears in the above-indentified patent and that said Letters Patent is hereby corrected as shown below:

On the tile page [56] References Cited, insert

--4,093,962 6/1978 Ishiguro et al. ...... 358/138

Foreign Patent Documents 62110365 5/1987 Japan 57173255 10/1982 Japan 3329045 12/1984 Germany 58139568 8/1983 Patent Abstracts of Japan 5718434 11/1982 Patent Abstracts of Japan 62176372 8/1987 Patent Abstracts of Japan

UNITED STATES PATENT AND TRADEMARK OFFICE
CERTIFICATE OF CORRECTION

PATENT NO. : 5,235,618
DATED : August 10, 1993
INVENTOR(S) : Kiyoshi SAKAI et al.

It is certified that error appears in the above-indentified patent and that said Letters Patent is hereby corrected as shown below:

Other Publications

Proceedings of the Third International Workshop on HDTV, Turin, IT, 30 August - 1st, September, 1989; pages 511-518 GEATANO CARONNA: 'ADAPTIVE DPCM WITH CONDITIONAL CODING; page 513, line 9 - line 13, figure 1--.

Column 2, line 24, delete "on".

Column 3, line 64, after "configure" insert --a--.

Column 7, line 52, before "counter" insert

--amount--.

UNITED STATES PATENT AND TRADEMARK OFFICE
CERTIFICATE OF CORRECTION

PATENT NO. : 5,235,618

DATED : August 10, 1993

INVENTOR(S) : Kiyoshi SAKAI et al.

It is certified that error appears in the above-indentified patent and that said Letters Patent is hereby corrected as shown below:

Column 12, line 66, delete "the" (second occurrence).

Signed and Sealed this

Fourth Day of July, 1995

Attest:

BRUCE LEHMAN

Attesting Officer     Commissioner of Patents and Trademarks